United States Patent
Noh

(10) Patent No.: US 10,170,777 B2
(45) Date of Patent: Jan. 1, 2019

(54) COOLING WATER DIRECT INJECTION TYPE FUEL CELL

(71) Applicants: Hyundai Motor Company, Seoul (KR); Kia Motors Corporation, Seoul (KR)

(72) Inventor: Young Woo Noh, Gyeonggi-Do (KR)

(73) Assignees: Hyundai Motor Company, Seoul (KR); Kia Motor Corporation, Seoul (KR)

(*) Notice: Subject to any disclaimer, the term of this patent is extended or adjusted under 35 U.S.C. 154(b) by 199 days.

(21) Appl. No.: 15/255,439

(22) Filed: Sep. 2, 2016

(65) Prior Publication Data

US 2017/0346108 A1 Nov. 30, 2017

(30) Foreign Application Priority Data

May 27, 2016 (KR) .................. 10-2016-0065235

(51) Int. Cl.
$H01M\ 8/04029$ (2016.01)
$H01M\ 8/04119$ (2016.01)
$H01M\ 8/2483$ (2016.01)
$H01M\ 8/0267$ (2016.01)

(52) U.S. Cl.
CPC ..... $H01M\ 8/04029$ (2013.01); $H01M\ 8/0267$ (2013.01); $H01M\ 8/04134$ (2013.01); $H01M\ 8/2483$ (2016.02)

(58) Field of Classification Search
CPC combination set(s) only.
See application file for complete search history.

(56) References Cited

U.S. PATENT DOCUMENTS

| 4,362,789 A | * | 12/1982 | Dighe | F28B 3/04 |
| | | | | 429/414 |
| 5,206,094 A | * | 4/1993 | Katz | H01M 8/04007 |
| | | | | 429/437 |
| 2001/0049906 A1 | * | 12/2001 | Shimazu | B01B 1/005 |
| | | | | 48/76 |

(Continued)

FOREIGN PATENT DOCUMENTS

| JP | 2005-209470 A | 8/2005 |
| JP | 2007-323993 A | 12/2007 |

(Continued)

*Primary Examiner* — Kaity V Chandler
(74) *Attorney, Agent, or Firm* — Mintz Levin Cohn Ferris Glovsky and Popeo, P.C.; Peter F. Corless

(57) ABSTRACT

A cooling water direct injection type fuel cell is provided. The fuel cell includes an air-side separator that has an air channel through which air flows, and a cooling water inlet aperture that is formed on an introduction portion of the air channel. A hydrogen-side separator is joined with the air-side separator and has a protrusion that is inserted into the cooling water inlet aperture. The protrusion has a diameter less than a diameter of the cooling water inlet aperture to form a gap between an outer circumferential surface of the protrusion and an inner circumferential surface of the cooling water inlet aperture. Cooling water drawn into space between the junction surfaces of the air-side separator and the hydrogen-side separator is discharged through the gap between the protrusion and the cooling water inlet aperture, is mixed with introduced air, and then is drawn into the air channel.

11 Claims, 4 Drawing Sheets

<A-A CROSS-SECTION>

(56) References Cited

U.S. PATENT DOCUMENTS

2003/0064266 A1* 4/2003 Ogami ............... F16K 24/044
429/413

FOREIGN PATENT DOCUMENTS

| KR | 10-2008-0070124 A | 7/2008 |
| KR | 10-2011-0013054 A | 2/2011 |
| KR | 10-2015-0132772 A | 11/2015 |
| WO | 2012/087265 A1 | 6/2012 |

* cited by examiner

<A-A CROSS-SECTION>

<B-B CROSS-SECTION>

COOLING WATER DIRECT INJECTION TYPE FUEL CELL

CROSS REFERENCE TO RELATED APPLICATION

The present application claims priority of Korean Patent Application No. 10-2016-0065235 filed on May 27, 2016, the entire contents of which is incorporated herein for all purposes by this reference.

BACKGROUND

Field of the Invention

The present invention relates to a cooling water direct injection type fuel cell in which cooling water is directly injected to a cathode to efficiently cool the cathode during a power generation operation of the fuel cell, and more particularly, to a cooling water direct injection type fuel cell which reliably secures the coupling force between an existing separator and a reaction part, despite employing the direction injection structure.

Description of the Related Art

A fuel cell is a system which combines oxygen of air and hydrogen and generates electric energy and water. In a generation mode of the fuel cell, a substantial amount of heat is generated from a cathode by exothermic reaction thus reducing the power generation efficiency of the fuel cell and reducing the relative humidity, resulting in performance degradation and deterioration.

Accordingly, the fuel cell generally includes a separate cooling water line for cooling, as well as including air and hydrogen lines. However, to form the cooling water line, a complex structure is required, thus increasing the production cost. Furthermore, the cooling efficiency is relatively low, and the cooling and the humidification are embodied by separate systems, and thus, there is duplication of the systems. Therefore, recently, a technique is being developed of directly injecting cooling water to embody the humidification and cooling at the same time.

In an example of a conventional art, a technique has been proposed of forming a cooling water passage by folding an end of a cathode-side separator. However, in this case, the folded end of the separator causes a membrane electrode assembly (MEA) functioning as a reaction part, a gas diffusion layer (GDL), or a porous body to be spaced apart from the end of the separator. Accordingly, the coupling force between the reaction part and the separator is reduced thus causing deformation of the separator. Further, deformation of the cooling line may also occur and the surface pressure applied to the reaction part may be uneven. Therefore, a cooling structure capable of directly injecting cooling water to the cathode separator while maintaining a stable structure is required to enhance the durability of the separator, and applying surface pressure to the reaction part more evenly.

The foregoing is intended merely to aid in the understanding of the background of the present invention, and is not intended to mean that the present invention falls within the purview of the related art that is already known to those skilled in the art.

SUMMARY

Accordingly, the present invention provides a cooling water direct injection type fuel cell in which cooling water is directly injected to a cathode to more effectively cool the cathode during a power generation operation of the fuel cell, and more particularly, which may reliably maintain the coupling force between an existing separator and a reaction part, despite employing the direction injection structure.

According to one aspect, a cooling water direct injection type fuel cell may include: an air-side separator having an air channel through which air flows, and a cooling water inlet aperture formed on an introduction portion of the air channel; and a hydrogen-side separator joined with the air-side separator and having a protrusion inserted into the cooling water inlet aperture, the protrusion having a diameter less than a diameter of the cooling water inlet aperture to form a gap between an outer circumferential surface of the protrusion and an inner circumferential surface of the cooling water inlet aperture, wherein cooling water drawn into the space between junction surfaces of the air-side separator and the hydrogen-side separator may be discharged through the gap between the protrusion and the cooling water inlet aperture, may be mixed with introduced air, and then may be drawn into the air channel.

An air inlet aperture may be formed in the air-side separator at a position spaced apart from the cooling inlet aperture, and air may be introduced through the air inlet aperture, may be mixed with the cooling water in the cooling water inlet aperture, and then may be drawn into the air channel. An aperture that communicates with the air inlet aperture of the air-side separator may be formed in the hydrogen-side separator, and the air may pass through the aperture and the air inlet aperture and then may be drawn toward the cooling water inlet aperture. Each of the protrusion and the cooling water inlet aperture may have a circular cross-section, and the diameter of the protrusion may be less than the diameter of the cooling water inlet aperture. The cooling water inlet aperture may have an elliptical section, and the elliptical cross-section may have a major diameter and a minor diameter, wherein the major diameter of the elliptical cross-section may have greater than the diameter of the protrusion.

A bonding depression and a relief depression may be respectively formed in the junction surfaces of the air-side separator and the hydrogen-side separator, and an adhesive may be charged into a space between the bonding depression and the relief depression to allow the air-side separator and the hydrogen-side separator to join with each other. The bonding depression may be formed on a side opposite to the air channel at a position spaced apart from the cooling water inlet aperture. An air inlet aperture may be formed in the air-side separator at a position spaced apart from the cooling inlet aperture, and the bonding depression may be formed between the air inlet aperture and the cooling water inlet aperture.

The cooling water inlet aperture may be disposed at an upper position based on a gravity direction, and the air channel may be formed along the gravity direction to mix the introduced air with the cooling water and then the introduced air may flow downward along the air channel in the gravity direction. The air inlet aperture and the cooling water inlet aperture may be formed between opposite portions of a partition-shaped gasket, and the air mixed with the cooling water may flow through space between the opposite portions of the partition-shaped gasket and then may be drawn into the air channel. The cooling water inlet aperture may be disposed on a flow path along which the air is introduced, and the air and the cooling water may be mixed with each other and form a turbulence flow.

As described above, in a cooling water direct injection type fuel cell according to the present invention, cooling water may be directly injected to a cathode, whereby the cathode may be effectively cooled during a power generation operation of the fuel cell. Moreover, despite employing the direction injection structure, the fuel cell according to the present invention may reliably maintain the coupling force between an existing separator and a reaction part.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the tem) "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the tem) "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the tem) "about."

Hereinbelow, an exemplary embodiment of the present invention will be described in detail with reference to the accompanying drawings.

Figure 1:
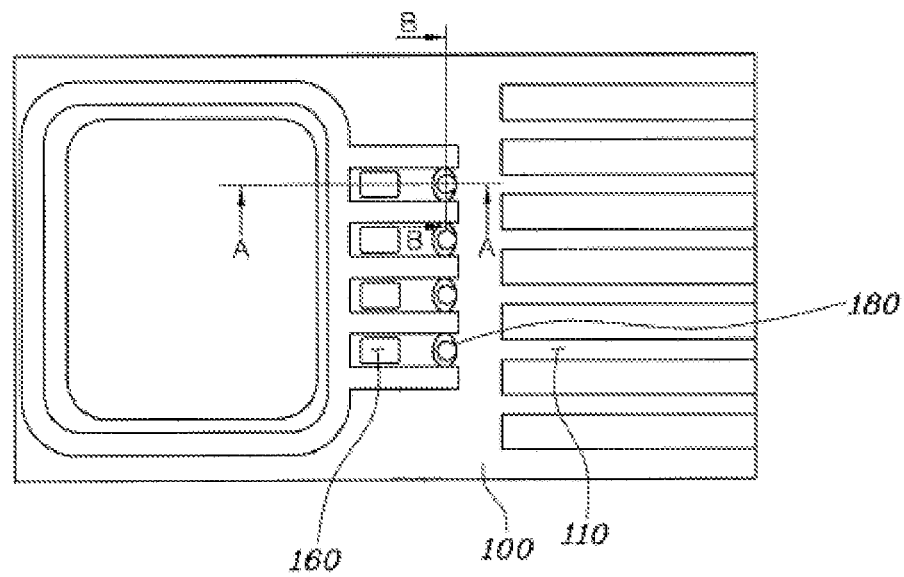
FIG. 1 is a plan view of an air-side separator of a cooling water direct injection type fuel cell according to an exemplary embodiment of the present invention.
Figure 2:
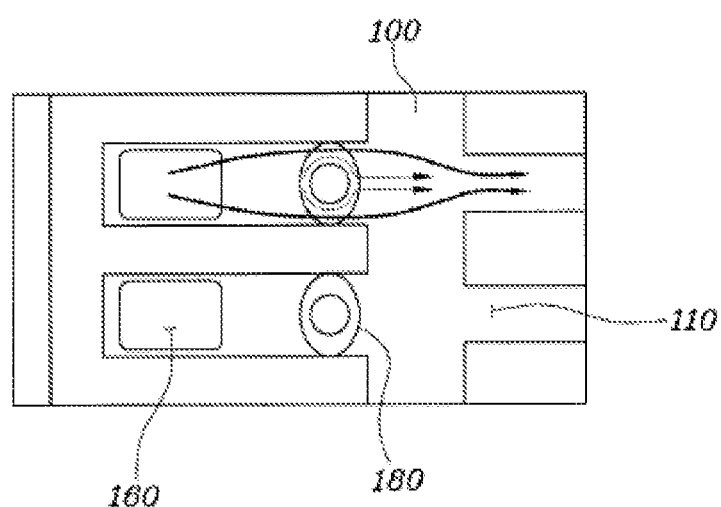
FIG. 2 is a detailed view of the cooling water direct injection type fuel cell according to the exemplary embodiment of the present invention shown in FIG. 1.
Figure 3:
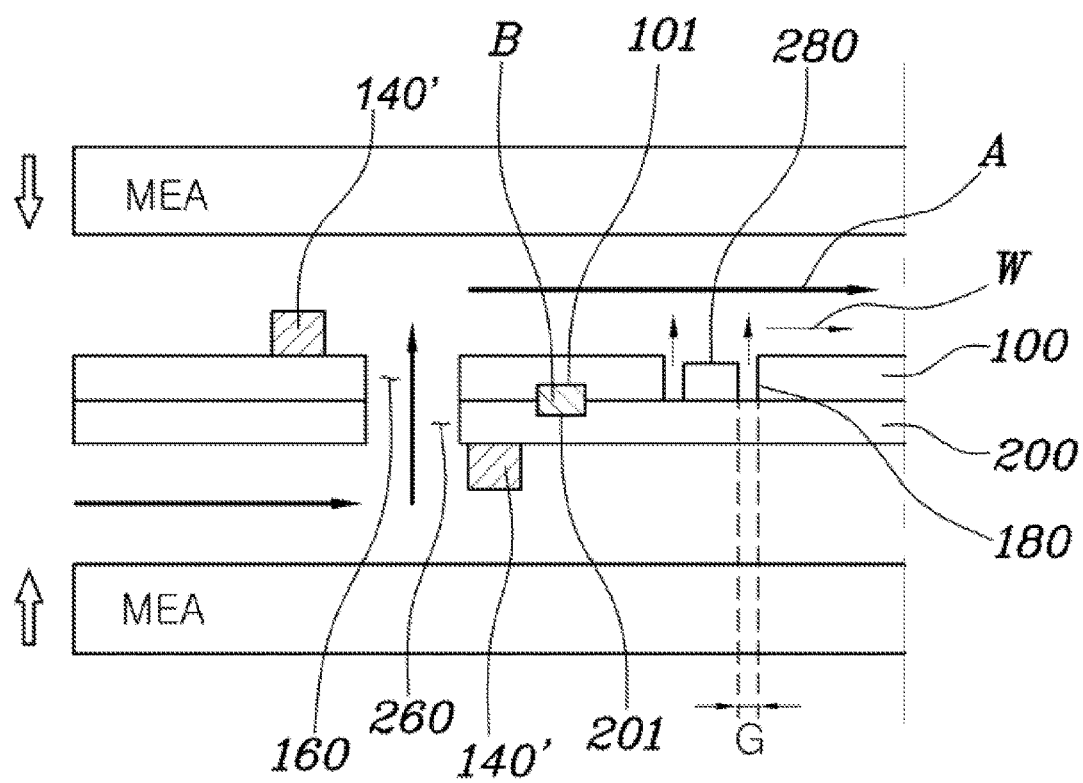
FIG. 3 is a sectional view taken along line A-A of FIG. 1 to illustrate the cooling water direct injection type fuel cell according to the exemplary embodiment of the present invention.
Figure 4:
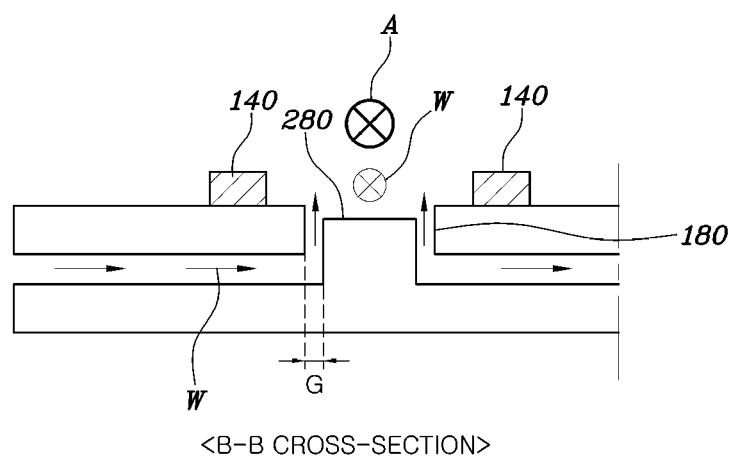
FIG. 4 is a sectional view taken along line B-B of FIG. 1 to illustrate the cooling water direct injection type fuel cell according to the exemplary embodiment of the present invention.

FIG. 1 is a plan view of an air-side separator of a cooling water direct injection type fuel cell according to an exemplary embodiment of the present invention. FIG. 2 is a detailed view of the cooling water direct injection type fuel cell according to the exemplary embodiment of the present invention shown in FIG. 1. FIG. 3 is a sectional view taken along line A-A of FIG. 1 to illustrate the cooling water direct injection type fuel cell according to the exemplary embodiment of the present invention. FIG. 4 is a sectional view taken along line B-B of FIG. 1 to illustrate the cooling water direct injection type fuel cell according to the exemplary embodiment of the present invention.

The cooling water direct injection type fuel cell according to the exemplary embodiment of the present invention includes an air-side separator 100 and a hydrogen-side separator 200. The air-side separator 100 may include an air channel 110 through which air flows, and a cooling water inlet aperture 180 formed on an introduction portion of the air channel 110. The hydrogen-side separator 200 may be joined with or coupled to the air-side separator 100 and may include a protrusion 280 inserted into the cooling water inlet aperture 180. The protrusion 280 may have a diameter less than that of the cooling water inlet aperture 180 and thus, a gap G may be formed between an outer circumferential surface of the protrusion 280 and an inner circumferential surface of the cooling water inlet aperture 180. Cooling water drawn (e.g., suctioned) into space between junction surfaces of the air-side separator 100 and the hydrogen-side separator 200 may be discharged through the gap G between the protrusion 280 and the cooling water inlet aperture 180, may be mixed with introduced air, and then may be drawn into the air channel 110.

FIG. 1 is a plan view of the air-side separator of the cooling water direct injection type fuel cell according to the exemplary embodiment of the present invention, and FIG. 2 is a detailed view of the cooling water direct injection type fuel cell according to the exemplary embodiment of the present invention shown in FIG. 1. The air-side separator 100 may include the air channel 110 through which air flows. The cooling water inlet aperture 180 may be formed on the introduction portion of the air channel 110.

Although not shown in FIGS. 1 and 2, the hydrogen-side separator 200 may be coupled to a lower surface of the air-side separator 100. In particular, the hydrogen-side separator 200 may be joined with the air-side separator 100 and may include the protrusion 280 inserted into the cooling water inlet aperture 180. The diameter of the protrusion 280 may be less than that of the cooling water inlet aperture 180 and thus, the gap G may be formed between the outer circumferential surface of the protrusion 280 and the inner circumferential surface of the cooling water inlet aperture 180.

Further, cooling water W may be drawn into space between the junction surfaces of the air-side separator 100 and the hydrogen-side separator 200. The drawn cooling water W may be discharged through the gap G between the protrusion 280 and the cooling water inlet aperture 180, may be mixed with introduced air A, and then may be drawn into the air channel 110. In the present invention, the separators and a membrane electrode assembly (MEA) may be matched and coupled to each other in a planar state without a gap therebetween. Therefore, deformation on ends of the separators may be prevented while allowing cooling water W to be mixed with air A and drawn along the air-side separator to perform cooling and humidification.

The air-side separator 100 may include an air inlet aperture 160 formed at a position spaced apart from the cooling water inlet aperture 180. Additionally, air A may be introduced through the air inlet aperture 160 and mixed with cooling water W in the cooling water inlet aperture 180 before being drawn into the air channel 110. In other words, as shown in the drawings, the air inlet aperture 160 may be formed in an upstream portion of an air flow path. Air introduced into the fuel cell may collide with a gasket 140', move upward through the air inlet aperture 160, and then may bend sideways (e.g., may curve) before being drawn into the air channel 110. The air may be mixed with cooling water W drawn through the cooling water inlet aperture 180 in an upstream portion of the air channel 110, and then may flow to the air channel 110. Therefore, cooling water W may be mixed with air A by the pressure of the introduced air A and then may be drawn into the air channel 110. Cooling water W drawn into the air channel 110 may flow along with air A and may be distributed onto the surface of the air-side separator 100. The air-side separator 100 may be cooled by latent heat due to evaporation. According to the above-mentioned structure, a separate humidification structure for humidifying a cathode may be omitted.

FIG. 3 is a sectional view taken along line A-A of FIG. 1 to illustrate the cooling water direct injection type fuel cell according to the exemplary embodiment of the present invention, and FIG. 4 is a sectional view taken along line B-B of FIG. 1 to illustrate the cooling water direct injection type fuel cell according to the exemplary embodiment of the present invention. The hydrogen-side separator 200 may include an aperture 260 (e.g., a through-hole) that communicates with the air inlet aperture 160 of the air-side separator 100. Additionally, air A may be introduced upward through the aperture 260 and the air inlet aperture 160, and then may flow sideways (e.g., curve, may be bent, etc.) and move toward the cooling water inlet aperture 180.

The cooling water inlet aperture 180 may be disposed on a path along which the air A flows, whereby the air A and the cooling water W may be mixed with each other, thus forming turbulence flow. The air A and the cooling water W may be appropriately mixed with each other, and the cooling water W may spread due to the air A and thus may be uniformly distributed to the air channel 110. The protrusion 280 and the cooling water inlet aperture 180 may have about the same circular cross-sections. The diameter of the protrusion 280 may be less than the diameter of the cooling water inlet aperture 180. In particular, cooling water may be introduced through the gap G between the two circles.

Alternatively, as shown in the drawings, the cooling water inlet aperture 180 may have an elliptical cross-section. In particular, the elliptical cross-section may have a major diameter and a minor diameter, and the major diameter of the elliptical cross-section may be greater than the diameter of the protrusion 280. Accordingly, the formation of the gap G between the cooling water inlet aperture 180 and the protrusion 280 may be reliably secured.

A bonding depression 201 and a relief depression 101 may be respectively formed in the junction surfaces of the air-side separator 100 and the hydrogen-side separator 200. An adhesive B may be charged (e.g., injected) into space between the bonding depression 201 and the relief depression 101, thus bonding the air-side separator 100 and the hydrogen-side separator 200 to each other. In other words, the bonding depression 201 may be formed in the upper surface of the hydrogen-side separator 200 and filled with the adhesive B. The relief depression 101 may be formed in the lower junction surface of the air-side separator 100 at a position that corresponds to the bonding depression 201. The adhesive B may be charged or injected into the space between the bonding depression 201 and the relief depression 101, whereby the air-side separator 100 and the hydrogen-side separator 200 may be joined with each other.

Furthermore, the air inlet aperture 160 may be formed in the air-side separator 100 at a position spaced apart from the cooling water inlet aperture 180. The bonding depression 201 may be formed between the air inlet aperture 160 and the cooling water inlet aperture 180. The bonding depression 201 may be formed on a side opposite to the air channel 110 at a position spaced apart from the cooling water inlet aperture 180. This structure may prevent a phenomenon in which the adhesive B is displaced from an original position and thus clogs the cooling water inlet aperture 180. The relief depression 101 may have a depth greater than that of the bonding depression 201 to prevent the adhesive B from flowing out.

The cooling water inlet aperture 180 may be formed at an upper position based on the gravity direction, and the air channel 110 may be formed along the gravity direction. Thus, the introduced air A may flow downward along the air channel 110 in the gravity direction after being mixed with the cooling water W. In other words, in the fuel cell, the air inlet aperture 160 into which air is introduced may be disposed at an upper position, and the air A and the cooling water W may flow more smoothly downward by the gravity. Accordingly, cooling water may be distributed to the overall region more evenly, and thus heat absorption may be effectively realized.

In addition, as shown in FIG. 4, the air inlet aperture 160 and the cooling water inlet aperture 180 may be formed between opposite portions of the partition-shaped gasket 140. The air A mixed with the cooling water W may pass through space between the opposite portions of the partition-shaped gasket 140 and may be drawn into the air channel 110. Accordingly, the air A may maintain a flow late (e.g., a constant flow rate) since the air may flow straight (e.g., linearly) between the opposite portions of the gasket 140. Hence, the cooling water W may flow further away and be more uniformly distributed in the air channel 110 by the constant flow rate of air A.

As described above, in a cooling water direct injection type fuel cell according to the present invention, cooling water is directly injected to a cathode, whereby the cathode may be effectively cooled during a power generation operation of the fuel cell. Moreover, despite employing the direction injection structure, the fuel cell according to the present invention may reliably maintain the coupling force between an existing separator and a reaction part.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A cooling water direct injection type fuel cell, comprising:
   an air-side separator having an air channel through which air flows, and a cooling water inlet aperture formed on an introduction portion of the air channel; and
   a hydrogen-side separator joined with the air-side separator and having a protrusion inserted into the cooling water inlet aperture, the protrusion having a diameter less than a diameter of the cooling water inlet aperture to form a gap between an outer circumferential surface of the protrusion and an inner circumferential surface of the cooling water inlet aperture, wherein the cooling water is drawn into a space between adjacent surfaces of the air-side separator and the hydrogen-side separator and is discharged through the gap between the protrusion and the cooling water inlet aperture, and is mixed with introduced air, and is then drawn into the air channel.

2. The cooling water direct injection type fuel cell according to claim 1, wherein an air inlet aperture is formed in the air-side separator at a position spaced apart from the cooling inlet aperture, and air is introduced through the air inlet aperture, and is mixed with the cooling water in the cooling water inlet aperture, and is then drawn into the air channel.

3. The cooling water direct injection type fuel cell according to claim 2, wherein an aperture that communicates with the air inlet aperture of the air-side separator is formed in the hydrogen-side separator, and the air passes through the aperture and the air inlet aperture and is then drawn toward the cooling water inlet aperture.

4. The cooling water direct injection type fuel cell according to claim 2, wherein the air inlet aperture and the cooling water inlet aperture are formed between opposite portions of a partition-shaped gasket, and the air mixed with the cooling water flows through space between the opposite portions of the partition-shaped gasket and is then drawn into the air channel.

5. The cooling water direct injection type fuel cell according to claim 1, wherein each of the protrusion and the cooling water inlet aperture has a circular cross-section, and the diameter of the protrusion is less than the diameter of the cooling water inlet aperture.

6. The cooling water direct injection type fuel cell according to claim 1, wherein the cooling water inlet aperture has an elliptical cross-section, and the elliptical cross-section has a major diameter and a minor diameter, wherein the major diameter of the elliptical cross-section is greater than the diameter of the protrusion.

7. The cooling water direct injection type fuel cell according to claim 1, wherein a bonding depression and a relief depression are respectively formed in the junction of adjacent surfaces of the air-side separator and the hydrogen-side separator, and an adhesive is injected into a space between the bonding depression and the relief depression to join the air-side separator and the hydrogen-side separator.

8. The cooling water direct injection type fuel cell according to claim 6, wherein the bonding depression is formed on a side opposite to the air channel at a position spaced apart from the cooling water inlet aperture.

9. The cooling water direct injection type fuel cell according to claim 7, wherein an air inlet aperture is formed in the air-side separator at a position spaced apart from the cooling inlet aperture, and the bonding depression is formed between the air inlet aperture and the cooling water inlet aperture.

10. The cooling water direct injection type fuel cell according to claim 1, wherein the cooling water inlet aperture is disposed at an upper position based on a gravity direction, and the air channel is formed along the gravity direction to mix the introduced air with the cooling water and allow the air to flow downward along the air channel in a gravity direction.

11. The cooling water direct injection type fuel cell according to claim 1, wherein the cooling water inlet aperture is disposed on a flow path along which the air is introduced, and the air and the cooling water are mixed with each other and form a turbulent flow.

* * * * *